United States Patent
Loeffler et al.

[11] Patent Number: 4,668,774
[45] Date of Patent: May 26, 1987

[54] 2-ETHYLHEXYLAMINE SALTS OF ANIONIC MONOAZO DYES

[75] Inventors: Hermann Loeffler, Speyer; Rainer Dyllick-Brenzinger, Weinheim, both of Fed. Rep. of Germany

[73] Assignee: BASF Aktiengesellschaft, Ludwigshafen, Fed. Rep. of Germany

[21] Appl. No.: 726,372

[22] Filed: Apr. 23, 1985

[30] Foreign Application Priority Data

May 3, 1984 [DE] Fed. Rep. of Germany ....... 3416327

[51] Int. Cl.$^4$ ............. C09B 44/02; C09B 44/04; C09B 44/06; C09B 44/08; C09B 69/04; D06P 1/02; D06P 1/44; D06P 1/46

[52] U.S. Cl. .................... 534/728; 106/23; 106/288 Q; 106/308 Q; 427/419.5; 544/99; 556/57; 556/61; 534/573; 534/649; 534/693; 534/697; 534/698; 534/700; 534/712; 534/724; 534/754; 534/756; 534/763; 534/772; 534/831; 540/132

[58] Field of Search ................ 534/693, 728, 700

[56] References Cited

U.S. PATENT DOCUMENTS

| | | | |
|---|---|---|---|
| 1,800,299 | 4/1931 | Kranzlein et al. | 534/728 |
| 1,800,300 | 4/1931 | Kranzlein et al. | 534/728 |
| 2,095,077 | 10/1937 | Payne | 534/728 X |
| 2,215,105 | 9/1940 | Krziualla | 534/693 |
| 2,315,870 | 4/1943 | Nadler et al. | 534/728 X |
| 2,628,960 | 2/1953 | Freyermuth | 534/693 |
| 2,816,886 | 12/1957 | Brenneisen et al. | 534/728 |
| 3,030,353 | 4/1962 | Kuster | 534/693 |
| 4,322,529 | 3/1982 | Kuster | 534/728 X |
| 4,359,418 | 11/1982 | Lienhard et al. | 534/728 |

FOREIGN PATENT DOCUMENTS

| | | | |
|---|---|---|---|
| 1160625 | 1/1984 | Canada | 534/728 |
| 767788 | 6/1953 | Fed. Rep. of Germany | 534/728 |
| 772800 | 4/1957 | United Kingdom | 534/728 |
| 1263288 | 2/1972 | United Kingdom | 534/728 |

*Primary Examiner*—Floyd D. Higel
*Attorney, Agent, or Firm*—Oblon, Fisher, Spivak, McClelland, & Maier

[57] ABSTRACT

Novel dye salts of anionic dyes of the general formula I

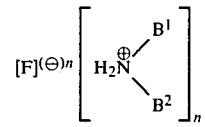

where F is a radical of an anionic dye, n is 1, 2, 3 or 4, and $B^1$ and $B^2$ independently of one another are each unsubstituted or substituted branched alkyl or alkyl-substituted cycloalkyl having a total of 10 to 36 carbon atoms, are very useful for dyeing solvents, printing inks or polymeric film-forming materials.

10 Claims, No Drawings

2-ETHYLHEXYLAMINE SALTS OF ANIONIC MONOAZO DYES

The present invention relates to dye salts of anionic dyes of the general formula I

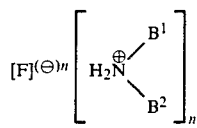

I where F is a radical of an anionic dye, n is 1, 2, 3 or 4, and $B^1$ and $B^2$ independently of one another are each unsubstituted or substituted branched alkyl or alkyl-substituted cycloalkyl having a total of 10 to 36 carbon atoms.

The radicals F of the anionic dyes are predominantly derived from the dioxazine, phthalocyanine, azo and metal complex dye series and generally carry sulfo groups as groups providing anionic radicals. In the case of 1:2 metal complexes, the anionic charge can be provided by the complex itself, the number of negative charges preferably being 1 or 2.

DETAILED DESCRIPTION OF THE PREFERRED EMBODIMENTS

In addition to containing the sulfo groups, the phthalocyanine radicals may furthermore contain substituents such as unsubstituted or substituted sulfamyl, chlorine, bromine, $C_1$–$C_4$-alkyl, methoxy, ethoxy or phenyl.

Ni phthalocyanines and, in particular, Cu phthalocyanines are preferred.

The azo dye radicals F may be derived from mono-, dis- or polyazo dyes, and those possessing up to three azo groups are preferred.

The diazo components are preferably derived from the aniline or aminonaphthalene series and, in addition to the sulfo groups which are preferably present, may be further substituted by, for example, fluorine, chlorine, bromine, methyl, ethyl, methoxy, ethoxy, phenoxy, nitro, cyano, methylsulfonyl, ethylsulfonyl, disubstituted sulfamyl or unsubstituted or substituted phenylazo.

Coupling components in the radicals F are preferably pyridones, pyrimidones, pyrazolones, pyrazoles, quinolones, or phenols which can be subsequently etherified.

Suitable metal complexes are compounds which are formed by treating o,o'-dihydroxy or o-carboxy-o'-hydroxyazo or azomethine dyes with, in particular, chromium donors or cobalt donors. These also include asymmetric 1:2 complexes obtained by adduct formation of a metal-free azo or azomethine dye with a 1:1 metal complex. Preferably, the complex dyes contain 1 or 2 sulfo groups, or are free of sulfo groups.

Examples of branched alkyl and substituted cycloalkyl radicals $B^1$ or $B^2$ are:
$CH_2CH(CH_3)_2$, $CH(CH_3)C_2H_5$, $CH_2$—$CH_2$—$CH(CH_3)_2$, $CH_2C(CH_3)_3$, $C(CH_3)_2C_2H_5$, $CH(CH_3)C_3H_7$, $CH(CH_3)CH(CH_3)_2$, $CH(CH_3)CH_2$—$CH$=$CH_2$, $CH_2CH(CH_3)C_2H_5$
$CH_2CH(CH_3)CH(CH_3)_2$, $CH_2CH(C_2H_5)_2$,
$CH_2CH(CH_3)C_3H_7$, $CH(C_2H_5)C_4C_9$,
$CH_2CH(C_2H_5)C_4H_9$, $CH(CH_3)C_3H_6CH(CH_3)_2$,
i—$C_9H_{19}$,
i—$C_{10}H_{21}$, i—$C_{13}H_{27}$,

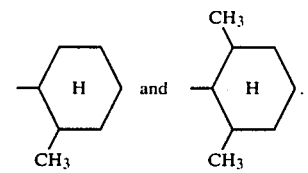

The iso forms of the $C_9$—, $C_{10}$— and $C_{13}$-alkyl radicals consist of mixtures of amine radicals, as formed by hydroformylation of alkenes and conversion of the products to amines.

Ammonium salt formation is carried out by reacting a dye acid or its alkyl metal salt with a secondary amine in the aqueous or aqueous organic, homogeneous or heterogeneous phase, at a pH of from 3 to 7 and at from $-20°$ to $+80°$ C. The product is isolated from the homogeneous aqueous organic medium by filtration, and from the two-phase aqueous reaction mixture by phase separation and evaporation of the organic solvent. It is advantageous to employ an aqueous organic mixture if the salt formed between the amine used and the organic or mineral acid is water-insoluble, and in particular if it does not form an oil which crystallizes.

With regard to the desired property profile, ie. extremely high solubility in a large number of low boiling organic solvents without heating, and insolubility in water, the use of precisely such amines for dye salt formation is particularly advantageous.

Since the tendency of the dye salts to crystallize during their formation is frequently very low, suitable measures for effecting crystallization are those which promote nucleation, eg. pronounced cooling, rubbing or the addition of seed crystals.

The dye salts of the formula I are liquid, crystalline or resin-like and, in contrast to the free acids and the alkali metal salts, generally possess an extremely high solubility in organic hydroxyl-containing solvents, in particular alcohols, glycols and glycol monoethers and mixtures of these with low boiling ketones and esters. The solubility in pure ketones and esters is dependent on the structure and is also very high in many cases, whereas the solubility in aromatics, pure aliphatics and water approaches 0.

The novel dye salts can advantageously be used for dyeing polymeric materials, such as secondary acetate rayon or cellulose triacetate. For the purposes of the present invention, polymeric materials are, in particular, those which are film-forming, color-bearing polymers and are used for finishing the surfaces of paper, glass, aluminum or plastic, or with the aid of which surfaces are printed, preferably by the flexographic printing method. Examples include nitrocellulose, ethylcellulose, polyvinyl chloride, polyvinylbutyral, shellac, rosin modified with phenol/formaldehyde resins, polyamide resins, condensates of formaldehyde with urea and and melamine, and polyacrylic acid resins. The metal-free dyes give dyeings which exhibit very good fastness to water and to grease, coupled with lightfastness equivalent to, or approaching, that of dye salts of complex acids containing heavy metals.

As a rule, the metal-free dyes furthermore possess improved solubility compared with the commercial metal complex dyes.

A group of useful compounds comprises those of the general formula Ia

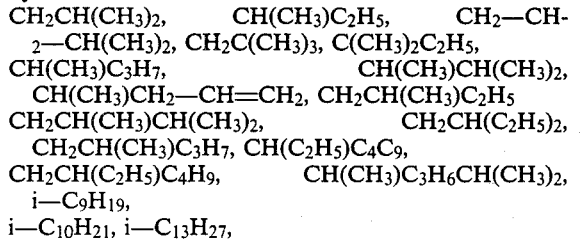

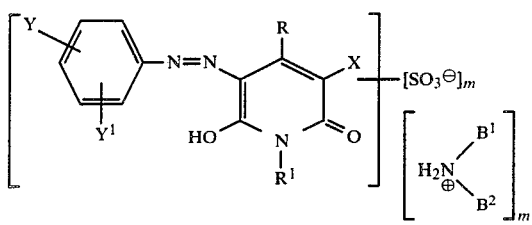

where Y is hydrogen, chlorine, bromine, methyl, ethyl, nitro, hydroxyl, methoxy, ethoxy, unsubstituted or hydroxysulfonyl-substituted phenoxy, a carboxylic ester group or substituted carbamyl or sulfamyl, $Y^1$ is hydrogen, chlorine, bromine, methyl, methoxy or hydroxysulfonyl, Y and $Y^1$ together form an unsubstituted or substituted benzo radical, R is hydrogen, $C_1$–$C_3$-alkyl, hydroxyl or hydroxysulfonylmethyl, $R^1$ is hydrogen or unsubstituted or substituted alkyl, cycloalkyl or aryl, X is cyano, chlorine, bromine, nitro, substituted carbamyl, alkyl- or arylsulfonyl, acetyl, hydroxysulfonyl or hydroxysulfonylmethyl, m is 1 or 2, and $B^1$ and $B^2$ have the stated meanings.

The carboxylic ester, sulfamyl and carbamyl radicals X and Y are of the formulae $COOR^1$, $SO_2R^1$, $CON(R^1)_2$ or $CONHR^1$, where $R^1$ has the meanings given below and the sum of the carbon atoms in the alcohol or amine moiety of the above groups must not exceed 8.

In addition to hydrogen, $R^1$ is, for example, $C_1$–$C_{13}$-alkyl or alkenyl, $C_2$–$C_6$-hydroxyalkyl, $C_4$–$C_9$-alkoxy- or aryloxyalkyl, $C_4$–$C_8$-hydroxyalkoxyalkyl, $C_9$–$C_{11}$-aralkoxyalkyl, $C_7$–$C_9$-hydroxysulfonylaralkyl, $C_4$–$C_{10}$-acyloxyalkyl, $C_4$–$C_8$-alkoxycarbonyloxyalkyl, $C_5$–$C_{12}$-alkylaminocarbonyloxyalkyl, cyclohexyl or unsubstituted or hydroxysulfonyl-substituted benzyl, phenylethyl or phenyl.

Specific radicals $R^1$ are, in addition to those stated above, (a)

$CH_3$, $C_2H_5$, $C_2H_4Cl$, n— and i—$C_3H_7$, $C_3H_6Cl$, $CH_2$—CH=$CH_2$,
$CH(CH_3)CH_2Cl$, n— and i—$C_4H_9$, $CH(CH_3)C_2H_5$, $C_4H_8Cl$, n— and i—$C_5H_{11}$, $CH_2C(CH_3)_3$, $C(CH_3)_2C_2H_5$,

$C_6H_{13}$,
$CH(CH_3)C_3H_7$, $CH(CH_3)CH(CH_3)_2$,
$CH(CH_3)CH_2CH$=$CH_2$,
$CH_2CH(CH_3)C_2H_5$, $CH_2CH(CH_3)CH(CH_3)_2$,
$CH_2CH(C_2H_5)C_2H_5$,
$CH_2CH(CH_3)C_3H_7$, $C_7H_{15}$, $CH(C_2H_5)C_4H_9$, $C_8H_{17}$, $CH_2CH(C_2H_5)C_4H_9$, $CH(CH_3)C_3H_6CH(CH_3)_2$, $C_9H_{19}$, $C_{10}H_{21}$, $C_{12}H_{25}$ and $C_{13}H_{27}$ and (b)

$C_2H_4OH$, $C_3H_6OH$, $C_4H_8OH$, $C_6H_{12}OH$, $C_2H_4OCH_3$, $C_2H_4OC_2H_5$, $C_2H_4OC_3H_7$,
$C_2H_4OC_4H_9$, $C_2H_4OC_6H_5$, $C_2H_4OCH_2C_6H_5$, $C_2H_4OC_2H_4OH$, $C_2H_4OC_2H_4OCH_3$,
$C_2H_4OC_2H_4OC_2H_5$, $C_2H_4OC_2H_4OC_3H_7$, $C_3H_6OC_2H_4OH$, $C_3H_6OC_4H_8OH$,
$C_2H_4CH(OCH_3)CH_3$, $C_3H_6OCH_3$, $C_3H_6OC_2H_5$, $C_3H_6OC_3H_7$, $C_3H_6OC_4H_9$,
$C_3H_6OC_6H_5$, $C_3H_6OCH_2C_6H_5$, $C_3H_6OC_2H_4OCH_3$, $C_3H_6OC_2H_4OC_6H_5$, $C_2H_4OCOCH_3$,
$C_3H_6OCOCH_3$, $C_2H_4OCO_2C_2H_5$, $C_3H_6OCO_2C_2H_5$, $C_2H_4OCON(C_2H_5)_2$,

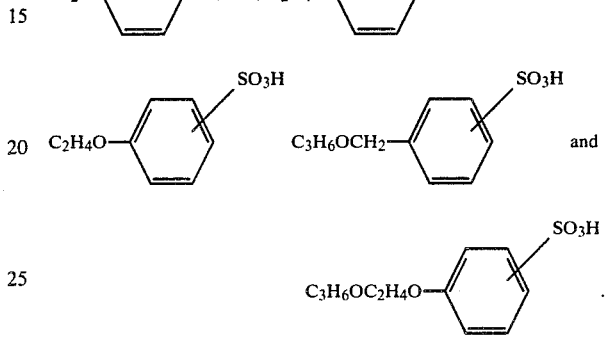

The acidic monoazo dyes used as starting materials for the dye salts of the formula I are known. They are prepared by combining a diazonium salt of an aniline or naphthylamine with a pyridone of the formula II

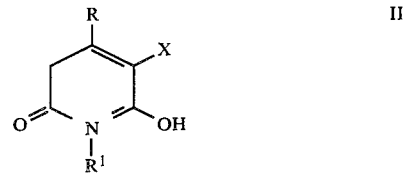

in an aqueous, strongly acidic to weakly alkaline medium. Salt formation is effected by the general method of preparation described above.

Surprisingly, the solubility of the novel dye salts is much higher than that of the similar dye salts disclosed in European Patent No. 5,222.

Of particular industrial importance are the dyes of the general formula III

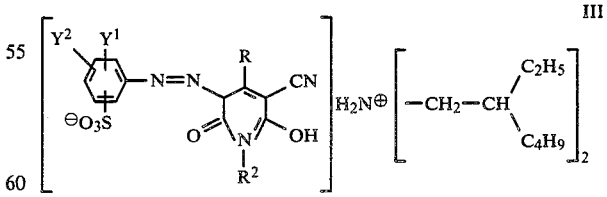

where R and $Y^1$ have the stated meanings, $Y^2$ is hydrogen, chlorine, bromine, methyl or methoxy and $R^2$ is $C_1$–$C_8$-alkyl, $C_2$–$C_7$-hydroxyalkyl or $C_3$–$C_{11}$-alkoxyalkyl. $R^2$ is particularly preferably a $C_1$–$C_4$-radical.

Another group of useful compounds comprises those of the general formula Ib

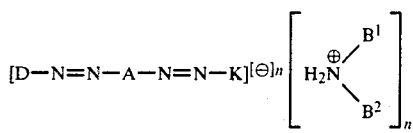

where $B^1$, $B^2$ and n have the stated meanings, D is a radical of a diazo component of the aniline or aminonaphthalene series, A is an unsubstituted or substituted phenylene, naphthylene or azobenzene radical, and K is a radical of the formula

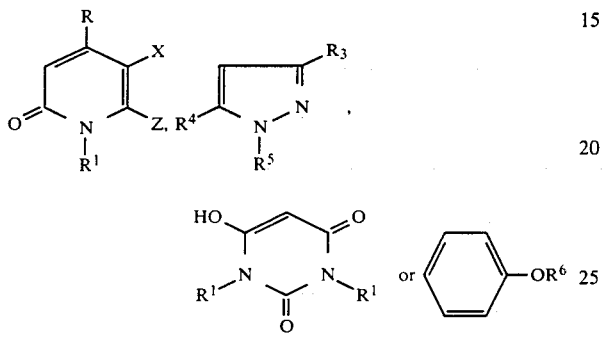

where R, $R^1$ and X have the stated meanings, Z is hydroxyl, X and Z together form a benzo radical which is unsubstituted or substituted by $Y^1$, $R^3$ is methyl, methoxycarbonyl, or ethoxycarbonyl, $R^4$ is methyl or hydroxyl, $R^5$ is hydrogen or phenyl which is unsubstituted or substituted by $Y^1$ and $Y^2$, $R^6$ is methyl, ethyl, hydroxyethyl, cyanoethyl or 2-hydroxy-3-chloropropyl, and $Y^1$ and $Y^2$ have the above meanings.

Examples of radicals D of diazo components are phenyl which is unsubstituted or substituted by fluorine, chlorine, bromine, methyl, methoxy, ethoxy, cyano, nitro, methylsulfonyl, ethylsulfonyl, N,N-disubstituted carbamyl or sulfamyl, $C_1$–$C_8$-alkoxycarbonyl or hydroxysulfonyl, and naphthyl which is unsubstituted or substituted by hydroxyl, nitro or hydroxysulfonyl.

Specific examples of diazo components are aniline, 2-, 3- and 4-chloroaniline, 2-, 3- and 4-nitroaniline, 2-, 3- and 4-methylaniline, 2-, 3- and 4-methoxyaniline, aniline-2-, -3- and -4-sulfonic acid, 3- and 4-aminobenzoic acid, methyl, ethyl and butyl 2-, 3- and 4-aminobenzoate, 2-, 3- and 4-aminobenzoic acid dimethylamide, diethylamide and dibutylamide, aniline-3- and -4-sulfonic acid dimethylamide, diethylamide and dibutylamide, and the polysubstituted anilines of the formula:

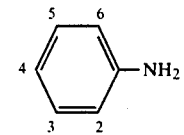

| 2 | 3 | 4 | 5 |
|---|---|---|---|
| OCH₃ | — | — | Cl |
| — | Cl | OCH₃ | — |
| OCH₃ | — | NO₂ | — |
| OCH₃ | — | — | NO₂ |
| OCH₃ | — | OCH₃ | — |
| OCH₃ | — | — | OCH₃ |
| OCH₃ | — | Cl | CH₃ |
| OCH₃ | — | OCH₃ | Cl |
| OCH₃ | — | Cl | OCH₃ |
| OCH₃ | — | NO₂ | CH₃ |
| OCH₃ | — | NO₂ | OCH₃ |
| OCH₃ | — | CH₃ | — |
| CH₃ | — | OCH₃ | — |
| OCH₃ | — | — | CH₃ |
| Cl | — | SO₃H | Cl |
| Cl | — | SO₃H | — |
| SO₃H | — | — | Cl |
| SO₃H | — | Cl | — |
| Cl | SO₃H | — | — |
| — | SO₃H | — | Cl |
| OH | SO₃H | — | Cl |
| NO₂ | — | SO₃H | — |
| SO₃H | — | NO₂ | — |
| OH | NO₂ | — | SO₃H |
| OH | SO₃H | — | NO₂ |
| OH | — | SO₃H | — |
| SO₃H | — | SO₃H | — |
| SO₃H | — | — | SO₃H |
| SO₃H | — | Cl | CH₃ |
| SO₃H | — | CH₃ | Cl |
| CH₃ | Cl | — | SO₃H |
| CH₃ | — | SO₃H | — |
| OCH₃ | — | NO₂ | SO₃H |
| — | — | SO₃H | CH₃ |
| SO₃H | — | CH₃ | — |
| OCH₃ | — | SO₃H | — |
| — | SO₃H | OCH₃ | — |
| SO₃H | — | OCH₃ | — |
| SO₃H | — | — | NHCOCH₃ |
| SO₃H | — | NHCOCH₃ | — |
| CH₃ | — | SO₃H | CH₃ |
| CH₃ | — | CH₃ | SO₃H | and 1-naphthylamine, 1-naphthylamine-2-, -3-, -4-, -5-, -6-, -7- and -8-monosulfonic acid, 2-naphthylamine-1-, -5-, -6-, -7- and -8-monosulfonic acid and the polysubstituted naphthylamines:

| 1 | 2 | 3 | 4 | 5 | 6 | 8 |
|---|---|---|---|---|---|---|
| NH₂ | — | SO₃H | — | — | SO₃H | — |
| NH₂ | — | SO₃H | — | — | — | SO₃H |
| NH₂ | OH | — | SO₃H | — | — | — |
| NH₂ | OH | — | SO₃H | — | NO₂ | — |
| OH | NH₂ | — | — | SO₃H | — | — |
| SO₃H | NH₂ | — | — | SO₃H | — | — |
| — | NH₂ | — | SO₃H | — | — | SO₃H |

The phenylene and naphthylene radicals A can be substituted by, for example, methyl, ethyl, methoxy, ethoxy, chlorine, bromine, nitro, cyano or hydroxysulfonyl.

Specific examples of preferred radicals are:

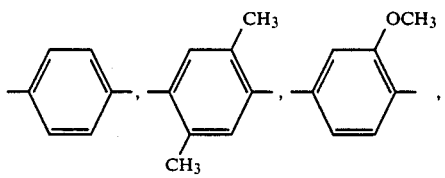

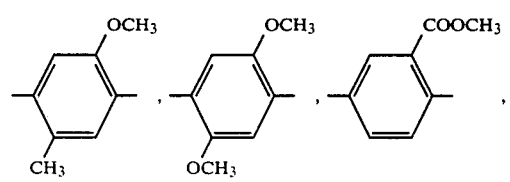

-continued

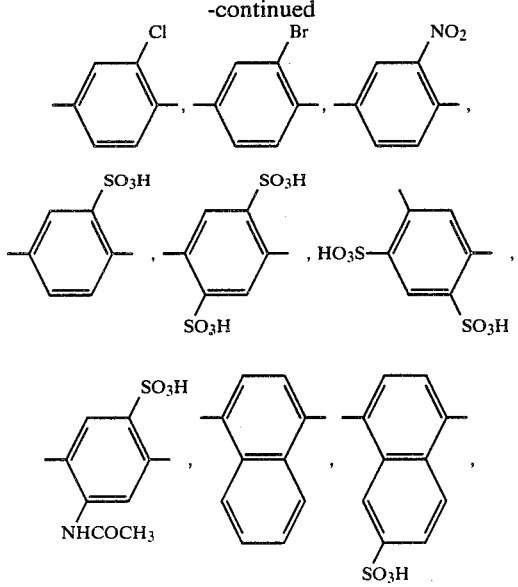

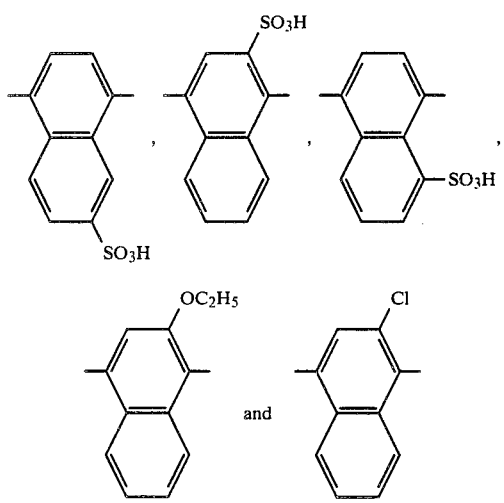

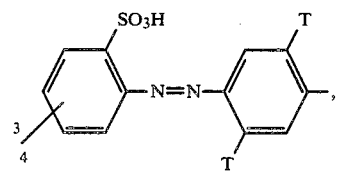

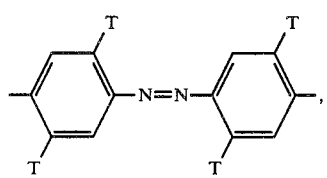

-continued

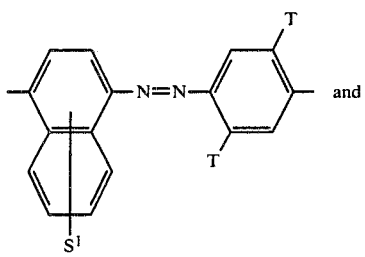   and

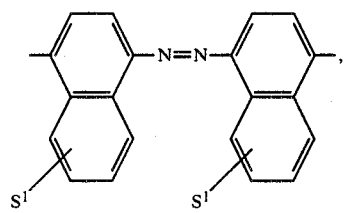, where $S^1$ is hydrogen or hydroxysulfonyl and T is hydrogen, methyl or methoxy.

The acidic disazo dyes used as starting materials for the dyes of the formula Ib are known. The trisazo dyes are obtained by diazotization of amino disazo derivatives and reaction with the coupling components. Diazotization and coupling are preferably carried out in an aqueous medium at from 0° to 40° C. by conventional methods. Where either the diazonium salt or the coupling component is poorly water-soluble, it is advantageous to carry out the reaction in the presence of a solubilizer, such as acetic acid, dimethyl formamide or N-methylpyrrolidone.

The novel dyes have the advantage that they are from 10 to 100 times more soluble than the disazo dyes described in U.S. Pat. No. 4,359,418, and only as a result of this are they suitable for the field of use described.

Of particular importance are compounds of the general formula III

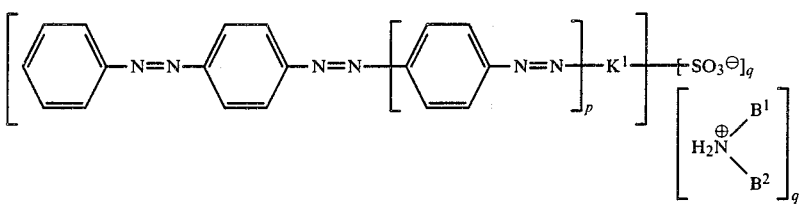

III where p is 0 or 1, q is 1 or 2 and $K^1$ is a radical of the formula

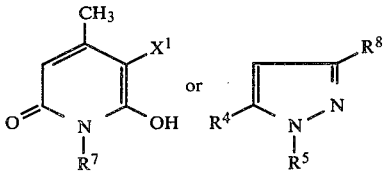

where $X^1$ is cyano or hydroxysulfonyl, $R^7$ is hydrogen, $C_2-C_6$-hydroxyalkyl or $C_4-C_8$-hydroxyalkoxyalkyl and $R^8$ is methoxycarbonyl or ethoxycarbonyl and $B^1$, $B^2$, $R^4$ and $R^5$ have the above meanings and the benzo rings may be further substituted.

Preferred substituents for the benzo rings are methyl and methoxy, in addition to hydroxysulfonyl.

Here, $B^1$ and $B^2$ are each particularly preferably also

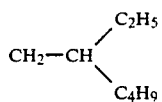

A third group of useful compounds comprises metal complexes of the general formulae Ic and Id

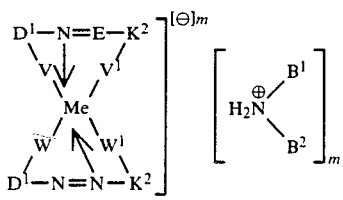

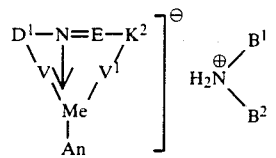

where E is N or CH, V and $V^1$ are each O or NH, W and $W^1$ are each COO or O, in each case adjacent to an azo or azomethine bridge, Me is Cr or Co, An is an anion, $D^1$ is a substituted phenyl or naphthyl radical, and $K^2$ is a radical of a carbocyclic or heterocyclic coupling component or an acetoacetarylide radical, or E and $K^2$ together form a radical of an aldehyde, and $B^1$, $B^2$ and m have the stated meanings.

Aldehyde radicals are preferably derived from benzaldehydes or naphthaldehydes which are unsubstituted or substituted by chlorine, bromine, nitro, methyl or methoxy, or may be derived from, for example, pyrazolonecarbaldehydes.

Examples of diazo components $D^1$ are the aniline derivatives of the formula

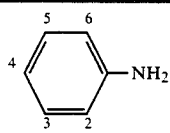

| 2 | 3 | 4 | 5 | 2 | 3 | 4 | 5 |
|---|---|---|---|---|---|---|---|
| OH | — | — | SO$_3$H | OH | — | — | NO$_2$ |
| OH | — | — | SO$_2$NH$_2$ | OH | — | NO$_3$ | — |
| OH | — | — | SO$_2$C$_2$H$_5$ | OH | — | NO$_2$ | Cl |
| OH | SO$_3$H | — | SO$_3$H | OH | — | — | Cl |
| OH | NO$_2$ | — | SO$_3$H | OH | COOH | — | CH$_3$ |

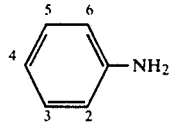

| 2 | 3 | 4 | 5 | 2 | 3 | 4 | 5 |
|---|---|---|---|---|---|---|---|
| OH | SO$_3$H | — | NO$_2$ | OH | NO$_2$ | — | CH$_3$ |
| OH | COOH | — | SO$_3$H | | | | |
| COOH | — | — | — | | | | |
| COOH | — | NO$_2$ | — | | | | |
| COOH | — | SO$_3$H | — | | | | | as well as 1-amino-2-hydroxynaphthalene-4-sulfonic acid and 1-amino-2-hydroxy-6-nitronaphthalene-4-sulfonic acid.

Examples of coupling components $K^2H$ are p-cresol, 2,4- and 3,4-dimethylphenoles, 2-naphthol, 2-naphthylamine, 2-naphthol-4-sulfonamides, 2-naphthol-6-sulfonic acid and its amides, and acetoacetic amilide, N-phenyl-5-pyrazolone-3-carboxylic acid and N-phenyl-3-methylpyrazol-5-one which is substituted by chlorine, bromine, methyl, methoxy, nitro, hydroxysulfonyl or unsubstituted or substituted sulfamyl.

When these are used to produce water-insoluble ammonium salts of the metal complexes, the products obtained possess excellent solubility in ether-alcohols, esters and ketones, so that in some cases 50% strength liquid formulations in these solvents can be obtained.

The Examples which follow illustrate the preparation. Parts and percentages are by weight unless stated otherwise.

EXAMPLE 1

39.2 parts of the azo dye formed from sulfanilic acid and 1-propyl-2,2'-dihydroxy-3-cyano-4-methylpyrid-6-one, in the form of the free acid, are dissolved in 750 parts by volume of water at room temperature. 2 parts of a dispersant, eg. Emulan ® OU, are added, and the pH is brought to 5 with dilute sodium hydroxide solution. A solution of 27.5 parts of di-(2-ethylhexyl)-amine and one part of Emulan ® OU in 50 parts by volume of 80% strength acetic acid is then added dropwise to the thoroughly stirred solution of the sodium dye salt in the course of about 1½ hours. In order to complete the crystallization and the reaction, stirring of the reaction mixture is then continued, first for 30 minutes at room temperature and then for one hour at 55°–60° C. and pH 3.9. The precipitated dye salt of the formula

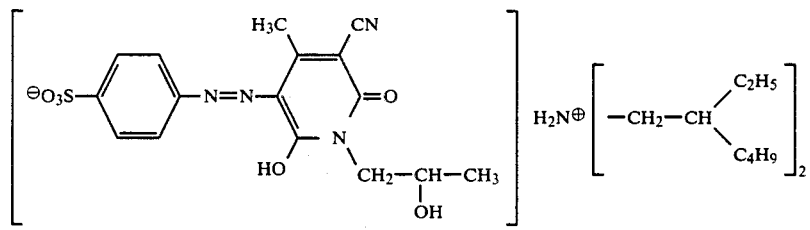

is filtered off under suction at room temperature, washed with water, and dried under reduced pressure at 50° C. The resulting yellow powder dissolves in ethanol at 20° C. ($\lambda_{max.}$ 434.5 μm) and in mixtures of ethanol with low boiling esters and ketones to give very highly concentrated solutions, and is very useful, in the conventionally used binders, for flexographic printing.

EXAMPLE 2

43.8 parts of the azo dye obtained from sulfanilic acid and 1-cyclohexyl-2-hydroxy-3-cyano-4-methylpyrid-6-one, in the form of the sodium salt, are dissolved in 1000 parts by volume of 40% strength ethanol at a pH of about 11, using 10 parts by volume of 50% strength sodium hydroxide solution. 27.5 parts of di-(2-ethylhexyl)-amine are added, and 44 parts by volume of 100% pure acetic acid are slowly added dropwise at from −10° to 0° C. Dye salt is brought to crystallization in a test tube, a seed crystal is introduced into the oily precipitate of the ammonium salt, and stirring is continued, the product slowly warming up to room temperature. The dye of the formula

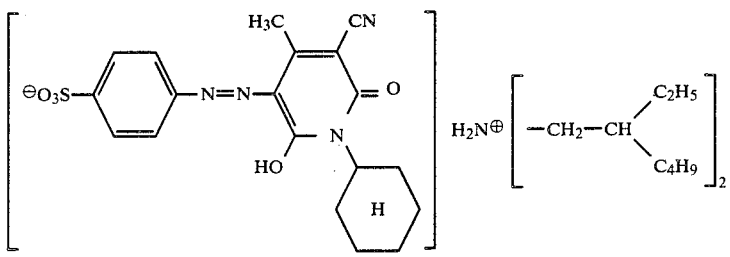

which completely crystallizes during this procedure is filtered off under suction, washed with water and dried under reduced pressure at 60° C. The pale yellow powder is very soluble in ethanol at room temperature ($\lambda_{max.} = 434\mu$) and also in mixtures of low boiling alcohols and low boiling esters and ketones, and, as a dye for flexographic printing, possesses excellent fastness to water and to grease on all possible substrates.

EXAMPLE 3

43.8 parts of the azo dye obtained from sulfanilic acid and 1-n-hexyl-2-hydroxy-3cyano-4-methylpyrid-6-one, in the form of the sodium salt, are stirred in 500 parts by volume of water and 150 parts by volume of ethyl acetate. Di-(2-ethylhexyl)-amine and acetic acid are added, as in Example 2, stirring is continued for one hour at 50° C. and the mixture is left to stand. The slightly yellow aqueous phase is run out, and the organic dye solution is dehydrated by distillation. The resulting solution is brought with a small amount of ethanol to a content of 50% of the dye of the formula

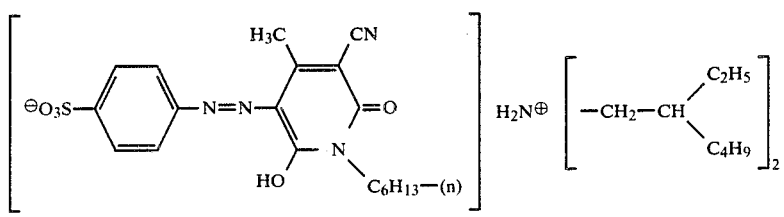

and in this form is suitable for dyeing resin materials as conventionally employed in binders for flexographic printing.

The dyes shown in the Table below, which substantially have the same property profile, can be obtained by the method described in Examples 1 and 2, if necessary with slight modifications to temperature and time, as required by the specific rate of crystallization.

TABLE 1

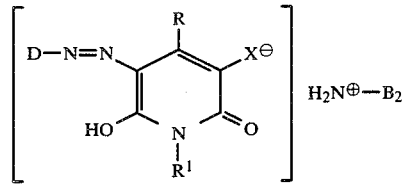

| Example No. | D | R | X | R¹ | B | $\lambda_{max}$ |
|---|---|---|---|---|---|---|
| 4 | O₃S—⟨phenyl⟩— | CH₃ | CN | CH₃ | CH₂—CH(C₂H₅)(C₄H₉) | 434.5 |
| 5 | " | " | " | C₂H₅ | " | 435 |
| 6 | " | " | " | C₂H₄OH | " | 435 |
| 7 | " | " | " | H | i-C₁₃H₂₇ | 435.5 |

TABLE 1-continued
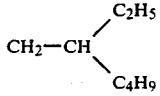
| Example No. | D | R | X | R$^1$ | B | $\lambda_{max}$ |
|---|---|---|---|---|---|---|
| 8 | " | " | COCH$_3$ | CH$_3$ | CH$_2$—CH(C$_2$H$_5$)(C$_4$H$_9$) | 435 |
| 9 | 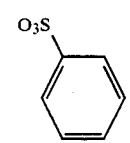 | " | CN | " | i-C$_{13}$H$_{27}$ | 431 |
| 10 | " | " | " | C$_2$H$_5$ | CH$_2$—CH(C$_2$H$_5$)(C$_4$H$_9$) | 431 |
| 11 | 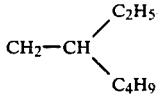 | " | " | CH$_3$ | " | 434 |
| 12 | 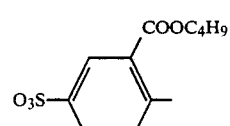 | " | " | " | " | 444 |
| 13 | " | " | " | CH$_2$—CH(OH)—CH$_3$ | " | 444 |
| 14 | " | " | " | C$_2$H$_4$OCH$_3$ | " | 444 |
| 15 | 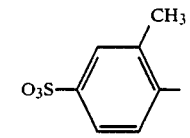 | " | CN | CH$_2$—CH(OH)—CH$_3$ | " | 439 |
| 16 | " | " | " | C$_2$H$_4$OCH$_3$ | " | 439 |
| 17 | 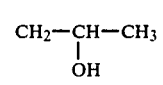 | " | " | CH$_2$—CH(OH)—CH$_3$ | " | 448.5 |
| 18 | 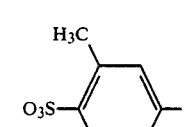 | CH$_3$ | CN | C$_2$H$_5$ | CH$_2$—CH(C$_2$H$_5$)(C$_4$H$_9$) | 448.5 |

TABLE 1-continued $$\left[\begin{array}{c} D-N=N \\ HO \end{array} \begin{array}{c} R \\ \\ N \\ R^1 \end{array} X^\ominus \right] \quad H_2N^\oplus{-}B_2$$

| Example No. | D | R | X | $R^1$ | B | $\lambda_{max}$ |
|---|---|---|---|---|---|---|
| 19 | 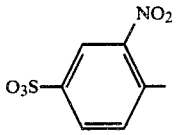 | " | " | $CH_3$ | " | 439.5 |
| 20 | " | " | " | H | $i\text{-}C_{13}H_{27}$ | 440 |
| 21 | " | " | " | $CH_2\text{—}CH\text{—}CH_3$ <br> \| <br> OH | $CH_2\text{—}CH\begin{array}{c}C_2H_5\\C_4H_9\end{array}$ | 439.5 |
| 22 | " | OH | $CONHC_2H_5$ | $C_2H_5$ | " | 435 |
| 23 | 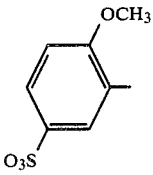 | $CH_3$ | CN | $C_4H_9$ | " | 453.5 |
| 24 | 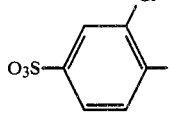 | " | " | $CH_3$ | " | 435 |
| 25 | 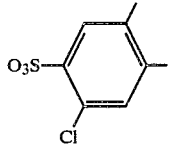 | " | " | $C_2H_5$ | " | 430.5 |
| 26 | " | " | " | " | $i\text{-}C_{13}H_{27}$ | 430.5 |
| 27 | " | " | " | $C_4H_9$ | $CH_2\text{—}CH\begin{array}{c}C_2H_5\\C_4H_9\end{array}$ | 430.5 |
| 28 | " | OH | $CONHC_2H_5$ | $C_2H_5$ | " | 429 |
| 29 | 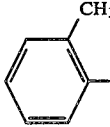 | $CH_3$ | $SO_3$ | $CH_3$ | " | 425.5 |
| 30 | " | " | $CH_2SO_3$ | " | " | 426 |
| 31 | 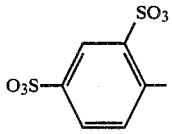 | " | CN | H | " | 434.5 |

TABLE 1-continued $$\left[ \begin{array}{c} D-N=N \\ \\ HO \end{array} \begin{array}{c} R \\ \\ N \\ | \\ R^1 \end{array} \begin{array}{c} X^\ominus \\ \\ O \end{array} \right] H_2N^\oplus-B_2$$

| Example No. | D | R | X | $R^1$ | B | $\lambda_{max}$ |
|---|---|---|---|---|---|---|
| 32 | 2,5-disulfophenyl (SO₃ at 2, O₃S at 5) | " | " | $CH_3$ | " | 429 |
| 33 | 4-sulfo-1-naphthyl (O₃S at position) | " | " | $C_2H_5$ | $CH_2-CH(C_2H_5)(C_4H_9)$ | 468 |
| 34 | 2-sulfophenyl (SO₃) | " | " | " | " | 431 |
| 35 | " | " | " | $C_4H_9$ | " | 431 |
| 36 | 4,7-disulfo-2-naphthyl | " | " | $CH_2-CH(OH)-CH_3$ | " | 458.5 |
| 37 | 6-methyl-sulfonaphthyl (SO₃) | " | " | $C_2H_5$ | " | 451.5 |

EXAMPLE 38

37.9 parts of 4-aminoazobenzene-3,4'-disulfonic acid, in the form of the sodium salt, are dissolved in 150 parts by volumes of water by stirring. The solution is cooled with 150 parts of ice, 30 parts by volume of a 3.33N sodium nitrate solution are added, and 30 parts by volume of a 30% strength aqueous hydrochloric acid are run rapidly into the thoroughly stirred mixture. During the addition, the temperature of the reaction mixture increases from 0° C. to 15° C., and the diazobetaine crystallizes out shortly thereafter. The mixture is stirred for one hour at from 10° to 15° C., after which the excess nitrous acid is destroyed with a little amidosulfonic acid and a solution of the coupling component, which is prepared by dissolving 20 parts of 1-(2-hydroxyethyl)-3-cyano-4-methyl-2-hydroxypyrid-6-one in 150 parts by volume of water and 5.5 parts by volume of 50% strength sodium hydroxide solution at a pH of about 5, is run in. When the mixture has been stirred for 30 minutes at 15° C., conversion of the diazonium salt is complete. Pre-prepared seeds are then added, and 50 parts of di-(2-ethylhexyl)-amine are slowly run in, the pH being kept at 4.2 by adding 5 parts by volume of acetic acid. Stirring is continued overnight at room temperature, and the product is filtered off under suction, washed salt-free with water and dried at 50° C. under reduced pressure. The resulting orange powder is of the formula

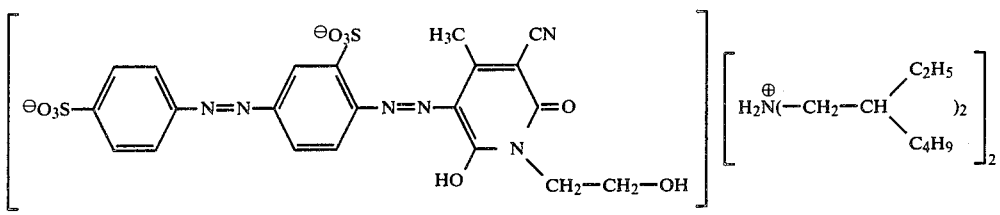

and dissolves in ethanol and ethanol/ethyl acetate and ethanol/methyl ethyl ketone mixtures to give extremely highly concentrated orange solutions $\lambda_{max.}=460$ nm). The dye salt is very useful for dyeing polymeric materials such as nitrocellulose, copolymers of styrene and maleic anhydride, polyvinyl chloride, polyvinylbutyral, shellac and acid-modified rosins. On paper, aluminum foils or plastic films as substrates, the dyed polymers exhibit very good lightfastness and fastness to water and to grease.

EXAMPLE 39

22.6 parts of a product obtained by coupling 4-aminoazobenzene-3,4′-disulfonic acid to 1-(2-hydroxyethoxyethyl)-3-cyano-4-methyl-8-hydroxypyrid-6-one (prepared under the conditions described in Example 1 and isolated as the disodium salt) are dissolved in 500 parts by volume of water, and the solution is stirred with 200 parts by volume of acetone and 24.5 parts of di-(2-ethylhexyl)-amine at 0° C. 50 parts by volume of acetic acid are slowly added dropwise until the pH reaches 4, and stirring is continued overnight, the mixture warming up to room temperature. The crystalline dye lake is filtered off under suction, washed with 30% strength acetone and then with water, and dried at 50° C. under reduced pressure.

The resulting ammonium salt of the formula

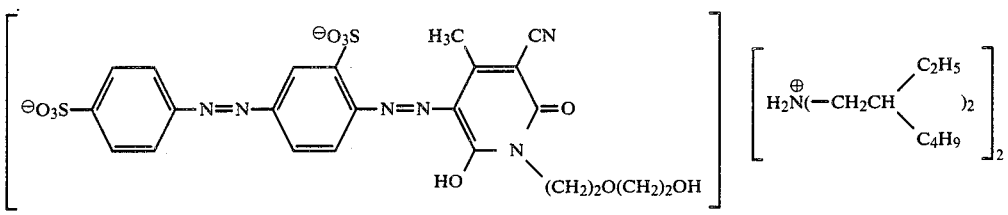

dissolves in ethanol to give very highly concentrated solutions ($\lambda_{max.}=459.5$ nm) and exhibits excellent fastness properties in all conventional binders when used for flexographic printing.

EXAMPLE 40

25.2 parts of the azo dye formed from 4-aminoazobenzene-3,4′-disulfonic acid and 2,6-dihydroxy-3-cyanopyridine, in the form of the free acid, are dissolved in 450 parts by volume of water and 300 parts by volume of ethanol at pH 9, using 12 parts by volume of 10% strength sodium hydroxide solution. The solution is stirred with 25 parts of di-(2-ethylhexyl)-amine at −15° C. Seed crystals are added to the reaction mixture, after which 30 parts by volume of acetic acid are added dropwise until the pH reaches 4. Stirring is continued for 2 hours, the mixture warming up to 0° C., and the product is filtered off under suction, washed with ice water and dried at 50° C. under reduced pressure. The resulting powder of the formula

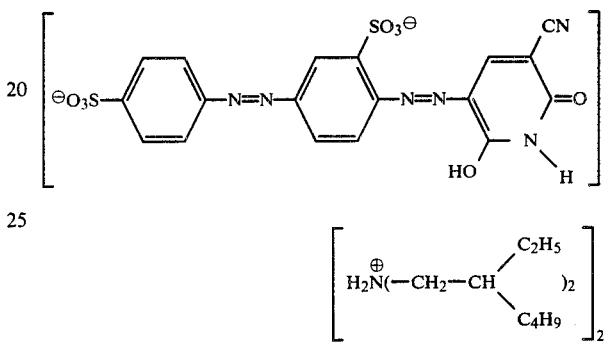

is very readily soluble in ethanol, producing an orange solution ($\lambda_{max.}=462$ nm). In the flexographic printing process, it gives prints which possess excellent lightfastness and fastness to grease, an allgro paper, glassine, aluminum foils, kraft paper and pulp.

EXAMPLE 41

29.5 parts of the azo dye formed from 4-aminoazobenzene-3,4′-disulfonic acid and 1-methyl-4-hydroxyquinol-2-one, in the form of the disodium salt, are dissolved in a mixture of 300 parts by volume of water and 200 parts by volume of acetone, using 5 parts by volume of 50% strength sodium hydroxide solution. 25.3 parts of di-(2-ethylhexyl)-amine and 50 parts by volume of 100% pure acetic acid are added until the pH reaches 4.4., after which the stirred mixture is refluxed (73° C.) for one hour, the dye going into solution. The mixture is cooled and then diluted to twice its volume with ice water, after which stirring is continued for about three hours at from −5° to −10° C., the dye salt particles which have separated out in the form of an oil crystallizing completely. The product is filtered off under suction, washed with a little 20% strength ethanol and then with water, and dried at 50° C. under reduced pressure. The orange dye salt of the formula

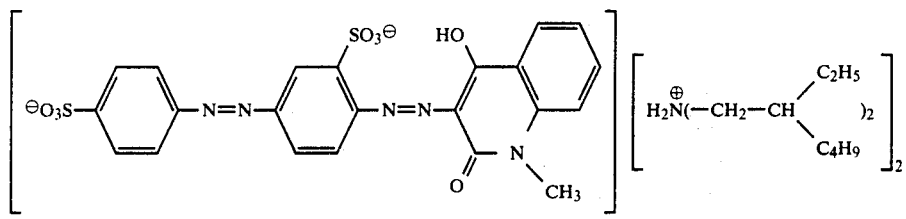

has an extremely high solubility in ethanol ($\lambda_{max.}$=451.5 nm) and, having very good fastness properties, is very useful for flexographic printing.

The dye salts shown in Table 1, which are very similar with respect to use and properties, are obtained similarly to Example 1 to 4.

TABLE 2

| Example | $R^1$ | R | X | Z | B | n | $\lambda_{max.}$ nm |
|---|---|---|---|---|---|---|---|
| 42 | CH₂CH—CH₃ \| OH | CH₃ | CN | OH | HN[CH₂—CH(C₄H₉)(C₂H₅)]₂ | 2 | 459.5 |
| 43 | C₃H₆OH | CH₃ | CN | OH | " | 2 | 460.5 |
| 44 | C₃H₆OC₄H₈OH | CH₃ | CN | OH | " | 2 | 460 |
| 45 | " | CH₃ | CN | OH | HN[CH₂—CH(C₄H₉)(C₂H₅)]₂ / HN[cyclohexyl-CH₃]₂ | — | 460 |
| 46 | C₄H₈OH | CH₃ | CN | OH | NH[CH₂—CH(C₂H₅)(C₄H₉)]₂ | 2 | 460 |
| 47 | H | CH₃ | CN | OH | " | 2 | 459.5 |
| 48 | CH₃ | CH₃ | SO₃ | OH | HN[CH₂—CH(C₂H₅)(C₄H₉)]₂ / HN[cyclohexyl-CH₃]₂ | — | 459 |

TABLE 2-continued

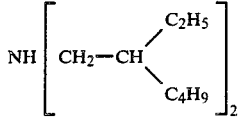

| Example | R¹ | R | X | Z | B | n | $\lambda_{max.}$ nm |
|---|---|---|---|---|---|---|---|
| 49 | CH₃ | H | CN | OH | NH[CH₂—CH(C₂H₅)(C₄H₉)]₂ | 2 | 462.5 |
| 50 | C₄H₉ | H | CN | OH | CH₂—CH(C₂H₅)(C₄H₉) | 2 | 462.5 |
| 51 | H | OH | CN | OH | " | 2 | 450 |
| 52 | C₂H₅ | OH | CONHC₂H₅ | OH | " | 2 | 449 |
| 53 | C₂H₅ | OH | ⟨phenyl⟩ | | " | 2· | 451.5 |
| 54 | C₄H₉ | OH | ⟨phenyl⟩ | | " | 2 | 451 |

EXAMPLE 55

25.3 parts of di-(2-ethylhexyl)-amine and 25 parts of formic acid are added to a coupling mixture containing 59 parts of 5-[4-(4'-sulfophenylazo)-phenylazo]-4-methyl-3-cyano-8-hydroxy-N-[3-(δ-hydroxybutoxy)-propyl]-pyrid-6-one in a two-phase mixture of 200 parts by volume of isobutanol and 400 parts by volume of water at 70° C. so that the pH is brought to 4.2. The lower, aqueous phase is separated off, and the remaining organic phase is dehydrated by distillation and brought to a content of 40% of the dye salt of the formula

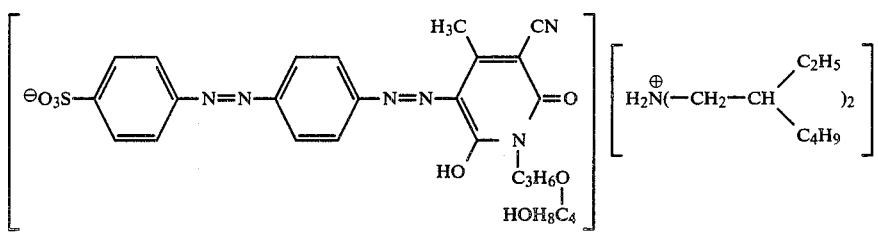

($\lambda_{max.}$ = 460.5 nm). This solution dyes nitrocellulose lacquer, by the method described in Example 111, in an orange hue having good fastness properties.

EXAMPLE 56

25.9 parts of 4'-(2,4-disulfophenylazo)-2,2',5,5'-tetramethyl-4-aminoazobenzene are dissolved in 300 parts by volume of water and sodium hydroxide solution at pH 8, and 15 parts by volume of 3.33N sodium nitrate solution are added. This solution is run into a thoroughly stirred mixture of 50 parts by volume of acetic acid and 200 parts by volume of water at 15°–20° C. After one hour, excess nitrous acid is destroyed with amidosulfonic acid, and a coupling component solution prepared from 15 parts of 1-[3-(δ-hydroxybutoxy)-propyl]-3-cyano-4-methyl-2-hydroxypyrid-6-one and 300 parts by volume of water is run in. After 30 minutes, the resulting solution is diluted with 250 parts by volume of acetone and cooled to 0°–5° C., and 25 parts of di-(2-ethylhexyl)-amine and 20 parts of acetic acid are added dropwise in succession so that a pH of 4.2 results. The dye salt, which is initially precipitated as a tacky product, gradually crystallizes through. The mixture is then diluted with ice water to an acetone content of 20%, and the product is filtered off under suction, washed with water and dried at 50° C. under reduced pressure. The bluish black powder of the formula

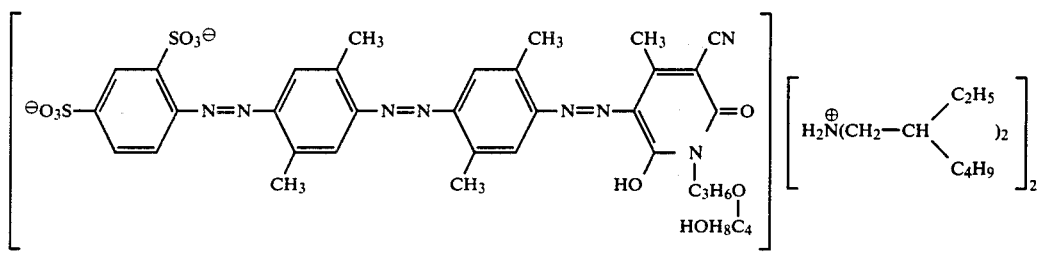

dissolves in ethanol, ethylglycol and 1-methoxypropan-2-ol to give highly concentrated brownish red solutions ($\lambda_{max.}$ = 488 nm) and is very useful as a dye for flexographic printing.

The dye salts shown in Table 3 below possess similar properties.

TABLE 3

| Example | T | U | A | X | R | B | n | $\lambda_{nm}^{max.}$ |
|---------|---|---|---|---|---|---|---|-----|
| 57 | H | SO₃ | 2,5-dimethoxyphenylene | CN | C₃H₆OH | HN(CH₂—CH(C₂H₅)(C₄H₉))₂ | 1 | 524.5 |
| 58 | SO₃ | SO₃ | 2,5-dimethylphenylene | CN | C₃H₆OH | " | 2 | 482 |
| 59 | H | SO₃ | 2,5-dimethoxyphenylene | CN | C₂H₄OH | " | 1 | 524 |
| 60 | SO₃ | SO₃ | phenylene | CN | C₂H₄OH | " | 2 | 467 |
| 61 | H | SO₃ | " | SO₃ | CH₃ | " | 2 | 466 |
| 62 | H | SO₃ | naphthylene-SO₃ | CN | CH₂—CH(OH)—CH₃ | " | 2 | 500.5 |

TABLE 3-continued $$\left[ U \underset{}{\overset{T}{\bigcirc}} -N=N-A-N=N \underset{HO}{\overset{H_3C\ \ \ X}{\underset{N}{\bigcirc}}}=O \right] \begin{matrix}(\ominus)_n\\ \ominus\\ [HB]_n\end{matrix}$$

| Example | T | U | A | X | R | B | n | $\lambda_{nm}^{max}$ |
|---------|---|---|---|---|---|---|---|---------|
| 63 | H | SO₃ | naphthalene-1,5-diyl with SO₃ | CN | H | " | 2 | 502 |
| 64 | H | SO₃ | naphthalene with SO₃ | CN | CH₂—CH(OH)—CH₃ | Primene 81-R ® | 2 | 474 |
| 65 | H | SO₃ | phenyl-N=N-xylyl with SO₃H, H₃C, H₃C | SO₃ | CH₃ | HN(CH₂—CH(C₂H₅)(C₄H₉))₂ | 3 | 479 |
| 66 | H | SO₃ | phenyl-N=N-phenyl with SO₃, H₃CO, H₃C | CN | C₃H₆OC₄H₈OH | " | 2 | 500 |
| 67 | SO₃ | SO₃ | phenyl-N=N-phenyl with CH₃, CH₃, H₃C, CH₃ | CN | C₂H₄OH | " | 2 | 487 |
| 68 | SO₃ | SO₃ | " | CN | C₂H₄OC₂H₄OH | " | 2 | 487 |

EXAMPLE 69

28.4 parts of the coupling product of 4-aminoazobenzene-3,4'-disulfonic acid with N,N-dimethylbarbituric acid, in the form of the disodium salt, are dissolved in 1000 parts by volume of water, and an ice-cooled homogeneous mixture of 24.8 parts of di-(2-ethylhexyl)-amine, 25 parts by volume of glacial acetic acid and 10.5 parts by volume of a 10% strength aqueous solution of an emulsifier (eg. Emulan ®]OU) is added dropwise to the thoroughly stirred mixture. The mixture, which gradually crystallizes through at pH 4, is slowly heated to 45° C., and stirring is continued for about one hour. Filtering under suction, washing with water and drying at 60° C. give the dye salt of the formula

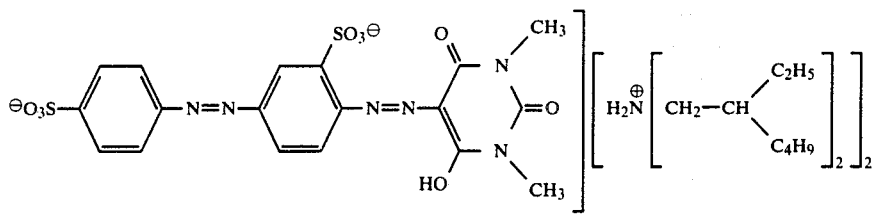

($\lambda_{max}$=418 nm; mp. 183°–187° C.) which very readily dissolves in low-boiling alcohols and mixtures of these with esters and ketones, and, as a flexographic dye in nitrocellulose lacquer, dyes paper and aluminum foil in greenish yellow hues with very good fastness properties.

EXAMPLE 70

23.6 parts of the azo dye obtained by reacting 4-amino-3,6-dimethoxyazobenzene-4'-sulfonic acid with phenol and then methylating the OH group are dissolved in 600 parts by volume of 20% strength ethanol. Seed crystals of the ammonium salt to be formed, which have been produced beforehand in a test tube, are added, and about 5% of a homogeneous mixture of 12.65 parts of di-(2-ethylhexyl)-amine, 18 parts of glacial acetic acid and 5.5 parts by volume of a 10% strength aqueous emulsifier solution (eg. Emulan® OU) is first added dropwise, while cooling with ice. Prolonged further stirring with cooling and further slow dropwise addition of the remaining amine solution result in complete precipitation and crystallization of the dye salt of the formula

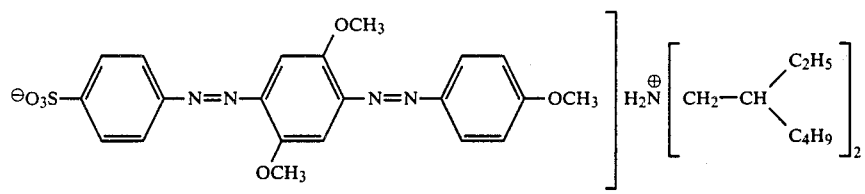

($\lambda_{max}$=453 nm), which possesses high solubility in alcohols and mixtures of these, and very good fastness properties as a flexographic dye.

EXAMPLE 71

26 parts of the aminodisazo dye obtained from 2,5-dimethyl-4-aminoazobenzene-2',4'-disulfonic acid and 2,5-dimethylaniline are dissolved in 400 parts by volume of water at a pH of about 7 with sodium hydroxide solution, and 15 parts by volume of a 3.33N sodium nitrate solution are added. This solution is run into 250 parts by volume of a 25% strength acetic acid at about 10° C., while stirring thoroughly, and stirring is continued for one hour at this temperature and in the presence of excess nitrous acid. Thereafter, the excess nitrous acid is destroyed with amidosulfonic acid, and a solution of 7.5 parts of 1,3-dimethylbarbituric acid in 200 parts by volume of water is poured into the gel-like diazo dispersion. After about 30 minutes, the gel-like reaction mixture is diluted with 500 parts by volume of acetone, and 25 parts of di-(2-ethylhexyl)-amine mixed with 34.5 parts by volume of acetic acid and 10.5 parts by volume of a 10% strength emulsifier solution are added dropwise to the ice-cold mixture. The mixture is stirred overnight at room temperature, after which the dye salt of the formula

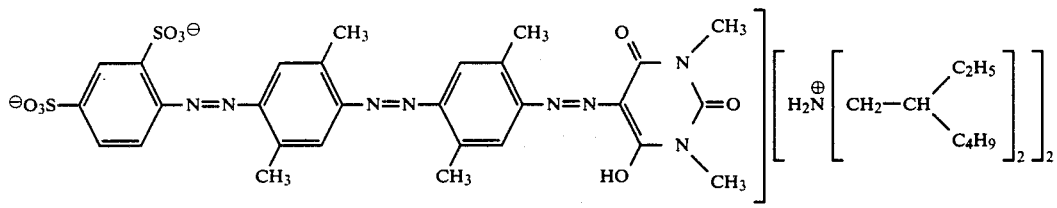

is filtered off under suction, washed with water and dried at 40° C. under reduced pressure. Alcoholic, nitrocellulose-containing solutions of this salt ($\lambda_{max.}$=444.5 nm) dye papers and aluminum foils in yellowish brown hues with good fastness properties.

EXAMPLE 72

30.9 parts of the azo dye obtained from 4-aminoazobenzene-3,4'-disulfonic acid and methyl N-(2'-chlorophenyl)-5-pyrazolone-3-carboxylate, as a water-moist filtration residue in the form of the disodium salt, are dissolved in 1000 parts by volume of 40% strength acetone. 24.8 parts of di-(2-ethylhexyl)-amine and 30% strength acetic acid are added dropwise at the same time, while cooling with ice, so that a pH of 4 results. The ammonium salt, which is initially obtained in a resin-like form, crystallizes through on stirring at room temperature. The product is filtered off under suction, washed with water and dried at 60° C. under reduced pressure.

The resulting dye salt of the formula

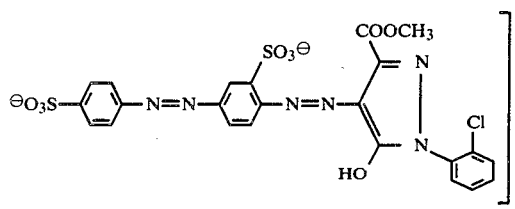

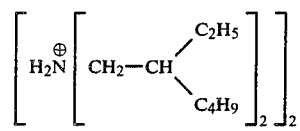

($\lambda_{max.}$=455.5 nm; mp. 170°–175° C.) possesses excellent solubility in low boiling alcohols and is very useful as a flexographic dye for producing orange hues.

The dyes shown in the Table below, which have a very similar property profile, can be obtained by the methods described in Examples 69 to 72, if necessary with slight modifications to the temperature and time, as required by the crystallization rate in specific cases.

TABLE 4

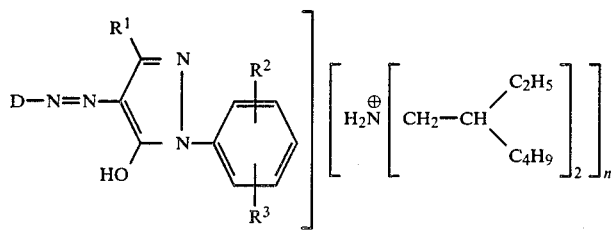

| Example No. | D | $R^1$ | $R^2$ | $R^3$ | $\lambda_{max.}$ |
|---|---|---|---|---|---|
| 73 | ⁻O₃S—⟨⟩—N=N—⟨⟩— | COOCH₃ | H | H | 458.3 |
| 74 | " | COOC₂H₅ | H | H | 460 |
| 75 | " | COOCH₃ | 2'-Cl | 6'-Cl | 467.5 |
| 76 | ⟨⟩(SO₃⁻)—N=N—⟨⟩— | COOCH₃ | 2'-Cl | H | 458 |
| 77 | ⁻O₃S—⟨⟩—N=N—⟨⟩— | CH₃ | 2'-SO₃⁻ | H | 437.5 |
| 78 | ⁻O₃S—⟨⟩—N=N—⟨⟩(Cl)— | CH₃ | — | H | 427.5 |
| 79 | " | COOCH₃ | 4'-SO₃⁻ | H | 448 |
| 80 | ⁻O₃S—⟨⟩—N=N—⟨⟩(Br)— | " | — | H | 449.5 |
| 81 | ⁻O₃S—⟨⟩—N=N—⟨⟩(SO₃⁻)— | CH₃ | H | H | 421.5 |

TABLE 4-continued
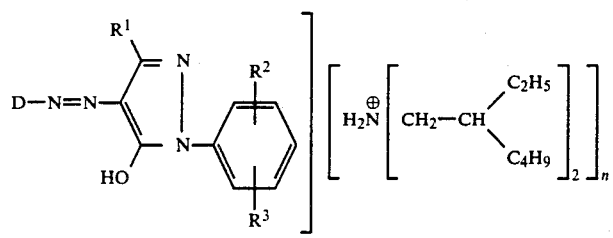
| Example No. | D | R¹ | R² | R³ | λ_max. |
|---|---|---|---|---|---|
| 82 | " | COOCH₃ | H | H | 451.5 |
| 83 | 4-⊖O₃S-C₆H₃(SO₃⊖)(NHCOCH₃)-N=N- | CH₃ | H | H | 439.5 |
| 84 | 4-⊖O₃S-C₆H₄-N=N-(2,5-(CH₃)₂C₆H₃)- | COOCH₃ | 2'-Cl | H | 475 |
| 85 | 4-⊖O₃S-C₆H₄-N=N-(5-OCH₃-2-CH₃-C₆H₃)- | COOCH₃ | 2'-Cl | 6'-CH₃ | 498.5 |
| 86 | 2,4-(⊖O₃S)₂C₆H₃-N=N-(2,5-(CH₃)₂C₆H₃)- | COOCH₃ | H | H | 475.5 |
| 87 | 2,4-(⊖O₃S)₂C₆H₃-N=N-(5-OCH₃-2-CH₃-C₆H₃)- | COOCH₃ | H | H | 498.5 |
| 88 | 2,4-(⊖O₃S)₂C₆H₃-N=N-(3,5-(OCH₃)₂C₆H₃)- | COOCH₃ | H | H | 525 |

TABLE 4-continued

[Structure: D—N=N—C(=C(OH)—)—C(R¹)=N—N(pyrazole ring)—phenyl(R², R³)] · [H₂N⁺(CH₂—CH(C₂H₅)(C₄H₉))₂]ₙ

| Example No. | D | R¹ | R² | R³ | λ_max |
|---|---|---|---|---|---|
| 89 | 2,5-disulfonatophenyl-N=N-naphthyl | COOCH₃ | 2'-Cl | 6'-CH₃ | 505.5 |
| 90 | 2,5-disulfonatophenyl-N=N-(2,5-dimethylphenyl)-N=N-(2,5-dimethylphenyl) | COOCH₃ | H | H | 486 |
| 91 | " | COOCH₃ | 2'-Cl | H | 486.5 |
| 92 | " | COOCH₃ | 2'-Cl | 6'-CH₃ | 490 |

EXAMPLE 93

44 parts of 4-amino-3,6-dimethoxyazobenzene-2,4'-disulfonic acid, in the form of the monosodium salt, are dissolved in 400 parts by volume of 50% strength acetic acid, and 30 parts by volume of a 3.33N sodium nitrite solution are added at from 15° to 20° C. The mixture is stirred at this temperature for 2 hours, after which 11 parts of acetylacetone are poured in in the absence of nitrous acid, and the pH is brought to 4 by the dropwise addition of ice-cold 25% strength sodium hydroxide solution. Shortly thereafter, the coupling reaction is complete. The disazo dye, which has been substantially precipitated, is filtered off under suction, washed with about 12% strength sodium chloride solution and stirred overnight at room temperature in a solution of 500 parts by volume of water, 48 parts of 50% strength sodium hydroxide solution and 10.5 parts of dihydrazine sulfate. Precipitation of the pyrazole dye is completed with 150 parts of potassium chloride and 50 parts by volume of glacial acetic acid at pH 5. The precipitate is filtered off under suction and the residue is washed with about 7% strength sodium chloride solution.

25.5 parts of the pyrazole disazo dye obtained in this manner are dissolved in 300 parts by volume of water, and a solution of 10.5 parts of di-(2-methylcyclohexyl)-amine in 50 parts by volume of water and 6 parts of glacial acetic acid added. The mixed ammonium salt of the formula

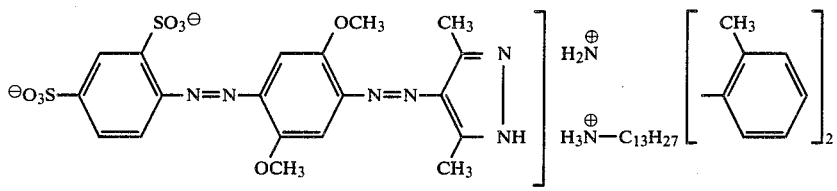

is precipitated by dropwise addition of a further solution of 11 parts of tridecylamine, 50 parts by volume of water and 6 parts of glacial acetic acid at 0°–5° C. The reaction mixture is slowly heated to 50° C. and stirred for a further hour, and the dye is filtered off under suction. The dye salt obtained dissolves very readily in ethanol (λ_max.=460.5 nm) and, when incorporated in nitrocelluloselacquer, dyes paper, plastic film and aluminum foil in yellowish red hues with very good fastness properties.

The dye salts shown in Table 5 have similar properties.

TABLE 5

$$\left[ D-N=N-\underset{\underset{CH_3}{|}}{\overset{\overset{CH_3}{|}}{C}}=\underset{\underset{N-H}{|}}{\overset{\overset{N}{|}}{C}} \right]^{(\ominus)_n} [BH^{\oplus}]_n$$

| Example | D | B | $\lambda_{max.}$ |
|---|---|---|---|
| 94 | $^{\ominus}O_3S$—C$_6$H$_3$—N=N—C$_6$H$_2$(OCH$_3$)$_2$ (2,5-OCH$_3$) | $HN\left[CH_2-CH\begin{matrix}C_2H_5\\C_4H_9\end{matrix}\right]_2$ | 463.5 |
| 95 | " | " | 462 |
| 96 | $^{\ominus}O_3S$—C$_6$H$_2$(SO$_3^{\ominus}$)—N=N—C$_6$H$_2$(OCH$_3$)$_2$ | $HN\left[CH_2-CH\begin{matrix}C_2H_5\\C_4H_9\end{matrix}\right]_2$ <br> $H_2N-C_{13}H_{27}$ | |
| 97 | naphthyl(SO$_3^{\ominus}$)—N=N—C$_6$H$_2$(OCH$_3$)$_2$ | $HN\left[CH_2-CH\begin{matrix}C_2H_5\\C_4H_9\end{matrix}\right]_2$ | 465 |
| 98 | $^{\ominus}O_3S$—C$_6$H$_2$(SO$_3^{\ominus}$)—N=N—C$_6$H$_2$(CH$_3$)$_2$—N=N—C$_6$H$_2$(CH$_3$)$_2$ | $HN\left[CH_2-CH\begin{matrix}C_2H_5\\C_4H_9\end{matrix}\right]_2$ <br> $H_2N-C_3H_6-O-CH_2-CH\begin{matrix}C_2H_5\\C_4H_9\end{matrix}$ | 414.5 |
| 99 | $^{\ominus}O_3S$—C$_6$H$_4$—N=N—C$_6$H$_2$(SO$_3^{\ominus}$)—N=N—C$_6$H$_2$(CH$_3$)$_2$ | " | 408 |

EXAMPLE 100

23.4 parts of 2-amino-4-nitrophenol-6-sulfonic acid and 26.7 parts of 2-hydroxy-5-nitrobenzaldehyde in 500 parts by volume of water are stirred and 14 parts of a chroming agent (e.g Chromitan ® MS, containing 18% of Cr(III)) and sulfuric acid are added until the pH=1. Condensation and chroming are complete when the mixture has been stirred for three hours at 120° C. in a closed vessel. The product is filtered off under suction at room temperature and washed with water, and the paste is dissolved in 500 parts by volume of water and ammonia water at pH 9 and at 60° C. 12.5 parts of di-(2-ethylhexyl)-amine are added, and formic acid is slowly added dropwise at 50° C. until the pH reaches 4.5. The product is filtered off under suction at room temperature and dried at 50° C. under reduced pressure to give the dye salt having the probable formula

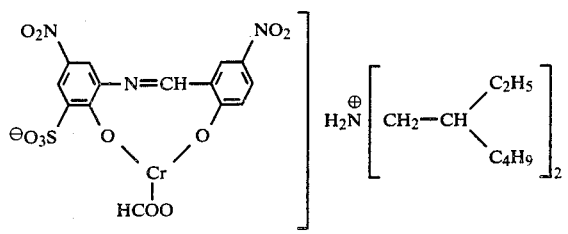

This dye salt is very readily soluble in alcohols ($\lambda_{max.}$ = 433 nm), esters and ketones, and is very useful for the use described in Examples 109 to 114.

EXAMPLE 101

If, using the procedure described in Example 100, 42 parts of the coupling product obtained from 4-nitro-2-aminophenol-6-sulfonic acid and 1-phenyl-3-methyl-pyrazol-5-one are chromed and the product is then reacted with di-(2-ethylhexyl)-amine, the dye salt of the formula

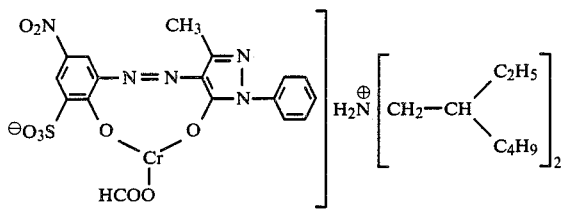

is obtained. This dye salt gives orange solutions ($\lambda_{max.}$ = 485 nm) and has similar properties.

EXAMPLE 102

A dye salt which gives a yellow solution ($\lambda_{max.}$ = 438 nm) and is of the formula

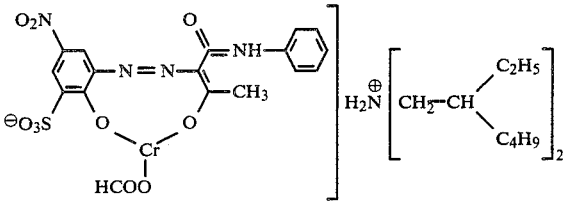

is obtained if 42 parts of the metal-free coupling product are chromed and then reacted with an amine, these steps being carried out as described in Example 100.

EXAMPLE 103

30.9 parts of a product obtained by coupling 4-nitro-2-aminophenol and 5-nitro-2-aminophenol to 2-naphthol, in 500 parts by volume of water, are heated to 90° C. in the presence of 14.1 parts of salicyclic acid and 14.75 parts of the chroming agent, and the pH is brought to 10.5 with sodium hydroxide solution. After the mixture has been stirred for two hours at 100° C., chroming is complete. 12.5 parts of di-(2-ethylhexyl)-amine are poured in at 70° C., and the pH is brought to 4.5 with formic acid. Stirring is continued for two hours at 70° C., after which the product is filtered off under suction, washed with water and dried. The resulting salt of the formula

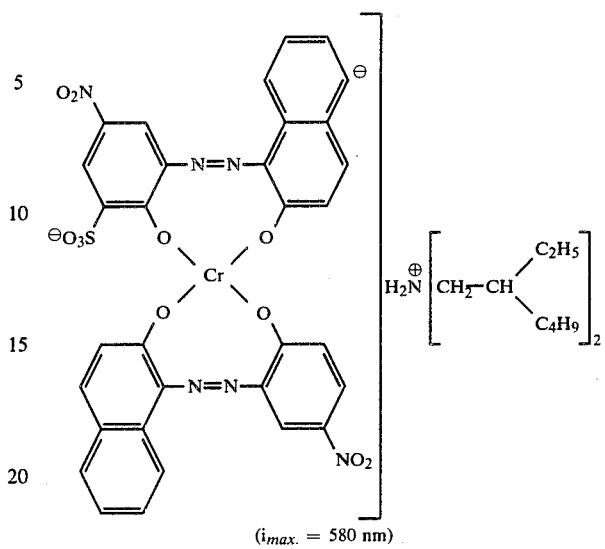

($\lambda_{max.}$ = 580 nm)

dissolves very readily in ethyl acetate, methyl ethyl ketone, ethylglycol, methyl isobutyl ketone and 2-methoxypropan-1-ol, and is very useful in this form for the preparation of printing inks.

Further symmetric 1:2 chromium complex salts with di-(2-ethylhexyl)-amine are shown in Table 6, these salts being obtained from the diazo components shown in column 1 and the coupling components shown in column 2, or by mixed coupling.

TABLE 6

| Example No. | Diazo component | Coupling component | $\lambda_{max}$ nm |
|---|---|---|---|
| 103 | Anthranilic acid | 1-Phenyl-3-methyl-pyrazol-5-one | 435 |
| 104 | 4-Nitro-2-amino-phenol-6-sulfonic acid | 1-Phenyl-3-methyl-pyrazol-5-one | 495 |
| 105 | 5-Nitro-2-amino-phenol | 1-Phenyl-3-methyl-pyrazol-5-one | 520 |
| 106 | 2-Aminophenol-4-sulfamide | 2-Naphthol | 555 |
| 107 | 4-nitro-2-amino-phenol 5-nitro-2-amino-phenol | 1-Phenyl-3-methyl-pyrazol-5-one | 500 |

EXAMPLE 108

30 parts of Cu phthalocyanine are introduced into 95 parts by volume of chlorosulfonic acid at from 20° C. to no higher than 60° C., and stirring is continued for 1 hour at 60° C. Thereafter, the reaction mixture is heated to 115° C. and diluted with a further 40 parts by volume of chlorosulfonic acid. After one hour at 120° C., the mixture is cooled to 40° C. and poured into a mixture of 1800 parts by volume of water and 1200 parts of ice, which contains one part of a complexing agent (eg. Trilon ® B). The sulfonyl chloride is filtered off under suction, washed with a little ice water and stirred with 50 parts of di-(2-ethylhexyl)-amine and 10 parts by volume of a 10% strength emulsifier solution, in 200 parts by volume of water and 130 parts of ice. Ammonium carbonate is then introduced a little at a time until the pH remains constant at 8–8.5, and stirring is continued overnight. The pH is then brought to 4 with formic acid, and stirring is continued for 2 hours at 50° C. The product is filtered off under suction, washed with water and dried at 50° C. under reduced pressure to give a dye salt of the approximate formula

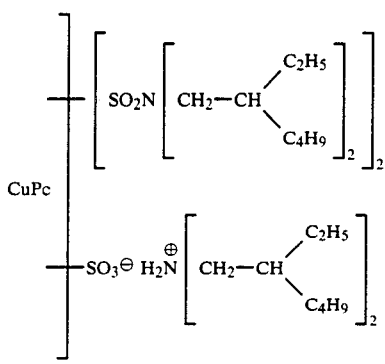

($\lambda_{max.}$=671 nm) which is very useful as a dye for printing inks.

EXAMPLE 109

21 parts of C.I. Direct Blue 108 are dissolved in 1000 parts of hot water, and 10% of a solution of 22.3 parts of di-(2-ethylhexyl)-amine, 31.5 parts of glacial acetic acid and 9.5 parts by volume of a 10% strength aqueous emulsifier solution is initially added dropwise at 0°–5° C. Stirring is continued for about one hour, after which the remainder of the amine solution is added dropwise, with warming to room temperature. Stirring is continued for 2 hours at 60° C., after which the product is filtered off under suction, washed with water and dried at 60° C. to give 40 parts of the ammonium salt of the formula

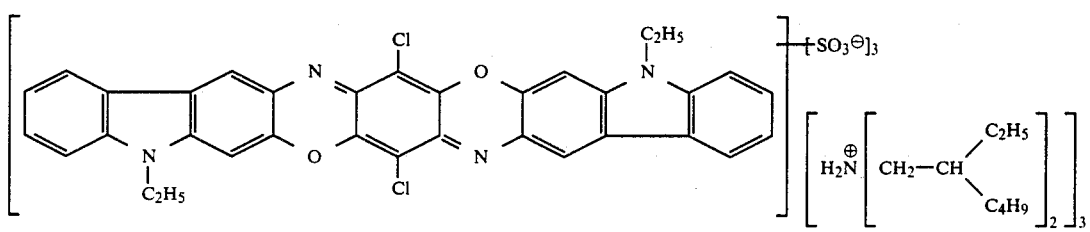

($\lambda_{max.}$=596 nm) which can be dissolved in ethanol and ethanol-containing esters and ketones to give highly concentrated solutions and can be applied from these onto a large variety of substrates, as printing ink.

EXAMPLE 110

0.5 part of the dye salt from Example 1 is stirred at room temperature in 19.5 parts of a styrene/maleic acid binder, consisting of 20% of resin in a mixture of 72% of ethanol (99.5% strength) and 8% of 1-methoxy-propan-2-ol, until it has completely dissolved. This printing ink is applied onto allgro paper, glassine, aluminum foil and kraft paper in a layer thickness of 24 μm by means of a coil coater from Erichsen GmbH and Co., Hermer-Sundwig/Westfalia, and the layer is then dried. The lightfastness according to DIN 54,004, the fastness to water according to DIN 53,991, sheet 1, and the fastness to grease are found to be very good.

EXAMPLE 111

0.5 parts of the dye from Example 38 is dissolved in 19.5 parts of a nitrocellulose lacquer which consists of 16.5% of nitrocellulose, 20.2% of ethyl acetate and 63.3% of ethanol, and the solution is applied by a knife coater onto glassine, allgro paper, kraft paper, pulp and aluminum foil by a procedure similar to that of Example 110. The brilliant orange coatings exhibit excellent adhesion, lightfastness, and fastness to water and to grease.

EXAMPLE 112

0.15 parts of the finely powdered dye salt from Example 38 is introduced into a solution of 25 parts of acetylcellulose in 75 parts of acetone, and the mixture is shaken until a true solution is formed. This orange solution is forced through a nozzle, and the spun filaments are dried with hot air by a countercurrent procedure. The orange filament material exhibits very good lightfastness, fastness to laundering and to crocking, and fastness to dry heat pleating and setting.

EXAMPLE 113

2.5 parts of the dye salt from Example 3 are dissolved in a mixture of 10 parts of a styrene/maleate resin, 10 parts of propanol, 10 parts of ethylglycol, and 67.5 parts of ethanol by shaking. This gives a greenish yellow ink for recording instruments.

EXAMPLE 114

2.5 parts of the dye from Example 93 are dissolved in a mixture of 15 parts of collodium cotton, 8 parts of n-butanol, 4 parts of ethylhexyl phthalate, 4 parts of dibutyl phthalate, 35 parts of ethylgylcol and 31.5 parts of toluene. When applied onto paper by knife coating and then dried, this printing ink exhibits good lightfastness.

EXAMPLE 115

A two-coat metallic finish on aluminum sheet is produced from the following two layers:

(a) Primer 58.3 parts of a polyacrylate, eg. 60% strength Luprenal ® 8479, 26.5 parts of a melamine resin, eg. 56% strength Luwipal ® 012, 66.7 parts of cellulose acetobutyrate (CAB 531-1), 15% strength in butyl acetate, 40 parts of BASF wax SC 9625, 10% strength in xylene, and 33 parts of an aluminum bronze, eg. Stapa ® Metallux 157, 32% strength in xylene, are dissolved in 120 parts of butyl acetate, the resulting mixture having a spray viscosity of 15–16 s. This mixture is applied onto an aluminum sheet, and the solvent is evaporated off at room temperature.

(b) Top coat 49.5 parts of 60% strength Luprenal 8479, 36.6 parts of 54% strength Luwipal 015, 1.2 parts of silicone oil A, 1% strength in xylene, and 1 part of the dye from Example 1 are dissolved in 29.7 parts of a mixture of aromatics, eg. 8:2 xylene/Solvesso ® 100, the resulting solution having a spray viscosity of 22 s. This solution is applied as a second coat onto the pretreated aluminum sheet by means of a spray gun, and the finish is cured by baking for 30 minutes at 130° C. The resulting luminous yellow finish possesses good lightfastness.

We claim:

1. A dye salt of the formula:

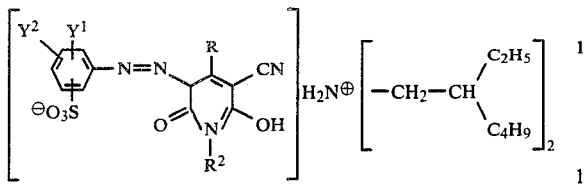

wherein:
$Y^1$ is hydrogen, chlorine, bromine, or methyl;
$Y^2$ is hydrogen, chlorine, bromine, or methyl;
R is hydrogen, or $C_1$–$C_3$ alkyl;
$R^2$ is $C_1$–$C_8$-alkyl, $C_2$–$C_7$-hydroxyalkyl, or cyclohexyl; and
$SO^{-3}$ is bound to the phenyl ring at the 3- or 4-position.

2. The dye of claim 1, wherein:
$Y^1$ is hydrogen;
$Y^2$ is hydrogen;
R is methyl;
$R^2$ is $CH_2$—$CH(OH)$—$CH_3$; and
$SO^{-3}$ is bound to the phenyl ring at the 4-position.

3. The dye of claim 1, wherein:
$Y^1$ is hydrogen;
$Y^2$ is hydrogen;
R is methyl;
$R^2$ is cyclohexyl; and
$SO^{-3}$ is bound to the phenyl ring at the 4-position.

4. The dye of claim 1, wherein:
$Y^1$ is hydrogen;
$Y^2$ is hydrogen;
R is methyl;
$R^2$ is n-hexyl; and
$SO^{-3}$ is bound to the phenyl ring at the 4-position.

5. The dye of claim 1, wherein:
$Y^1$ is hydrogen;
$Y^2$ is hydrogen;
R is methyl;
$R^2$ is methyl, ethyl or $C_2H_4OH$; and
$SO^{-3}$ is bound to the phenyl ring at the 4-position.

6. The dye of claim 1, wherein:
$Y^1$ is hydrogen or methyl;
$Y^2$ is hydrogen;
R is methyl;
$R^2$ is methyl, ethyl, or $CH_2$—$CH(OH)$—$CH_3$; and
$SO^{-3}$ is bound to the phenyl ring at the 4-position.

7. The dye of claim 1, wherein:
$Y^1$ is hydrogen or methyl;
$Y^2$ is hydrogen or methyl;
R is methyl;
$R^2$ is $CH_2$—$CH(OH)$—$CH_3$, or ethyl; and
$SO^{-3}$ is bound to the phenyl ring at the 4-position.

8. The dye of claim 1, wherein:
$Y^1$ is hydrogen or chlorine;
$Y^2$ is hydrogen or chlorine;
R is methyl;
$R^2$ is methyl, ethyl, or butyl; and
$SO^{-3}$ is bound to the phenyl ring at the 3- or 4-position.

9. The dye of claim 1, wherein:
$Y^1$ is hydrogen;
$Y^2$ is hydrogen;
R is methyl;
$R^2$ is methyl, ethyl, or butyl; and
$SO^{-3}$ is bound to the phenyl ring at the 3- or 4-position.

10. A dye salt of the formula:

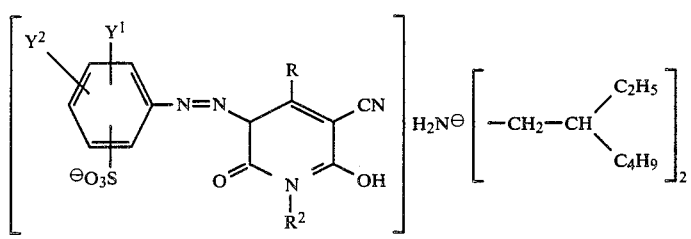

wherein:
$Y^1$ is hydrogen, chlorine, bromine, methyl, or methoxy;
$Y^2$ is hydrogen, chlorine, bromine, methyl, or methoxy;
R is hydrogen, or $C_1$–$C_3$-alkyl;
$R^2$ is $C_1$–$C_8$-alkyl, $C_2$–$C_7$-hydroxyalkyl, or cyclohexyl; and
$SO^{-3}$ is bound to the phenyl ring at the 3- or 4-position.

* * * * *

UNITED STATES PATENT AND TRADEMARK OFFICE
CERTIFICATE OF CORRECTION

PATENT NO. : 4,668,774

DATED : May 26, 1987

INVENTOR(S) : Loeffler, et al.

It is certified that error appears in the above-identified patent and that said Letters Patent is hereby corrected as shown below:

--A priority document was omitted from the Letters Patent. The second priority document is as follows:

Sept. 15, 1984 [DE] Fed.Rep. of Germany......3433950

Signed and Sealed this

Eighth Day of September, 1987

*Attest:*

*Attesting Officer*

DONALD J. QUIGG

*Commissioner of Patents and Trademarks*